Nov. 22, 1938.  L. H. COOPER  2,137,979

AUTOMOBILE DECKING DEVICE

Filed April 4, 1934  2 Sheets-Sheet 1

INVENTOR
Lawson H. Cooper
BY
ATTORNEYS

Nov. 22, 1938.  L. H COOPER  2,137,979
AUTOMOBILE DECKING DEVICE
Filed April 4, 1934  2 Sheets-Sheet 2

INVENTOR
Lawson H. Cooper
BY
ATTORNEYS

Patented Nov. 22, 1938

2,137,979

UNITED STATES PATENT OFFICE 2,137,979

AUTOMOBILE DECKING DEVICE

Lawson H. Cooper, Flint, Mich., assignor to Carl W. Bonbright, Flint, Mich., as trustee Application April 4, 1934, Serial No. 718,923

23 Claims. (Cl. 105—368)

The present invention pertains to a novel decking device for loading automobiles and like vehicles in freight cars.

Due to the fact that ordinary freight cars are not exactly divisible by the length of automobiles, considerable of the space within the car is wasted if the automobiles are placed therein, to rest upon the floor thereof. In view of this fact it has become customary to support some of the automobiles by directly resting them on the floor and to support other automobiles in the same car in a slightly elevated and inclined position, with the result that all available space is occupied with pay load. The automobiles are ordinarily supported in their elevated and inclined positions by use of decking timbers which must be secured to the floor and which either have to be discarded after being used or returned to the loading point. As a consequence of this practice expense is incurred in return freight charges and the interior of the car becomes damaged so that it must be repaired at frequent intervals. Accordingly it is the primary object of the present invention to provide efficient and easily operated means for supporting automobiles in an elevated and inclined position, the means being so constructed and arranged that it is permanently installed in the car. In this connection the present device has the advantage that repeated installation and removal are not necessary and the car interior is not subject to damage as a result of such operation. In addition the device is so constructed that when it is not in use it may be moved to a position in close proximity to the ceiling of the car so that it offers no interference to reloading the car with other merchandise for the return trip and so that it occupies such a small amount of space that the car can carry its normal load.

With the above in mind, reference is had to the accompanying drawings, in which

Figure 3:
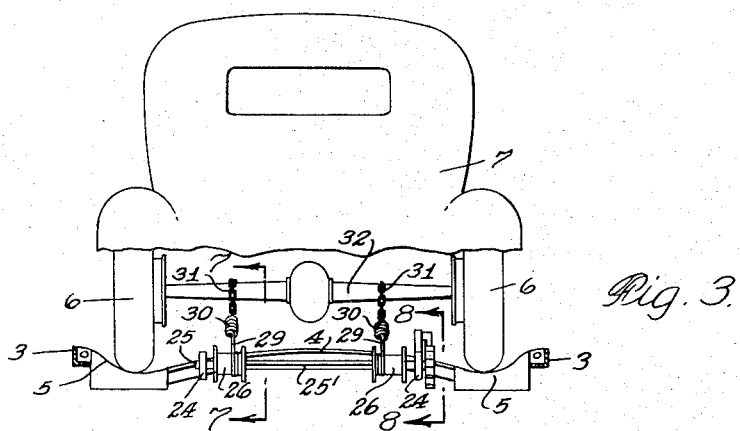
Fig. 3 is a cross section taken on the line 3—3 of Fig. 2, and illustrating an automobile on the device.
Figures 7, 8:
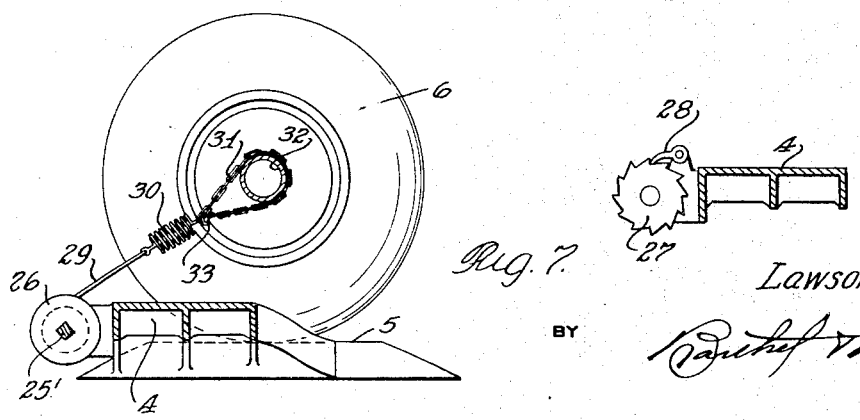

Figs. 7 and 8 are cross sections taken respectively on the lines 7—7 and 8—8 of Fig. 3.

The numeral 1 indicates the end wall of a freight car having a pair of parallel guide tracks 2 imbedded therein and extending vertically. An automobile supporting structure comprised of a pair of spaced apart lengthwise extending side rails 3 are secured together by cross tie members 4. The tie members 4 are formed with tread plates 5 upon which the wheels 6 of an automobile 7 rest. The ends of the side rails 3 extend into the guide tracks 2 and are retained therein, in a manner permitting vertical sliding movement by means of rollers 8 which are rotatably mounted adjacent to the said ends.

The rear walls 2' of the guide tracks 2 are provided with notches 10 and the ends of the side rails 3 are provided with latch bolts 35 adapted to cooperate with the notches in their respective guides. The latch bolts and their operating devices are illustrated as being slidably received in blocks 36. Coiled springs 37 are mounted in the blocks 36 and normally urge the bolts 35 to a position where they extend from the ends of the rails. A connecting rod 38 has one end connected to a link 39 and the other end of the link 39 is connected to a lever 40. The lever 40 is rotatably mounted in its respective frame member 3 and is provided with an operating handle 41 having an extension or part 42 adapted to engage the rail 3.

Figure 5:
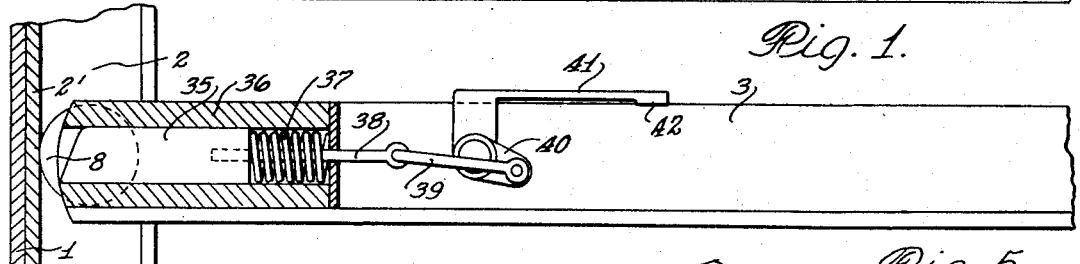
Figs. 4, 5 and 6 are enlarged fragmentary details.
Figure 4:
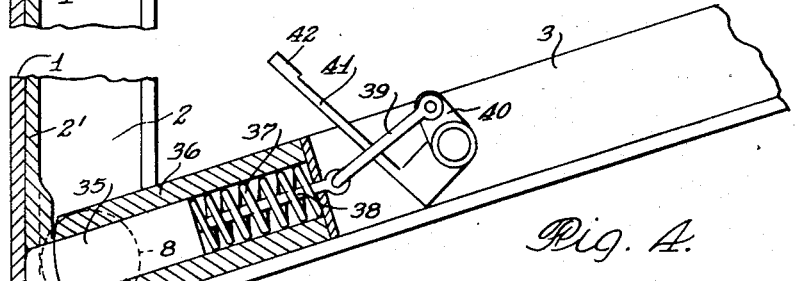
Figure 6:
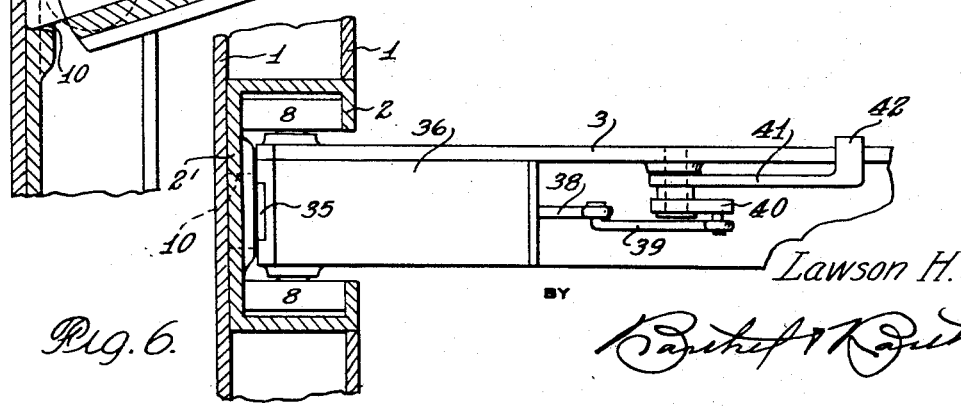
Figure 2:
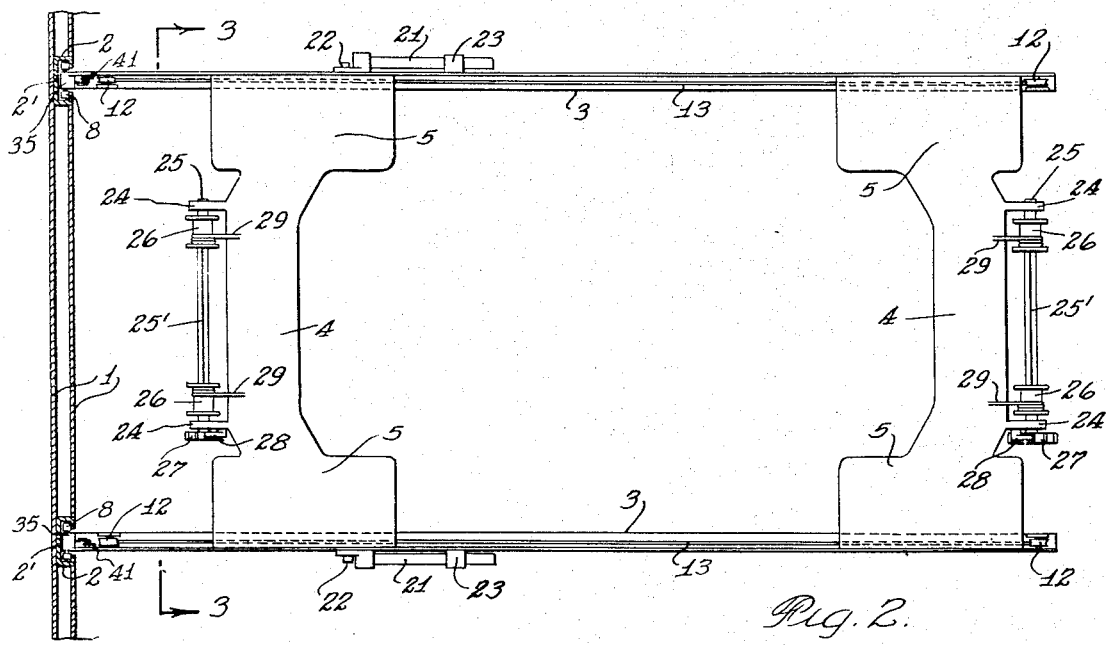
Fig. 2 is a plan of the decking device.

As shown in Fig. 5 the latch bolt is held in its retracted position by engagement of the handle 41 with the rail 3 which prevents rotation of the lever 40 in a clockwise direction. In order to permit the latch bolt to be projected as a result of pressure exerted by the spring 37 manual pressure is exerted on the hand lever 41 to rotate it in a counter-clockwise direction.

Adjacent to each end of each side rail 3 is rotatably mounted a sheave 12 and a cable 13 has one end anchored as at 15 to the ceiling 14 of the car and is trained under the pair of sheaves on each side rail. That is to say there is a cable under the pair of sheaves on each side rail. Mounted adjacent to the ceiling 14 is a rotatable drum 16 and the two cables 13 are secured to the drum so that when the latter is rotated the cables are wound around the same or unwound therefrom. No particular means has been shown for rotating the drum 16 because various types of devices, such as chain falls, are available on the market and well known in the art.

Connecting rods 17 are attached to the side rails 3 by means indicated at 18, the means comprising a swivel connection so that the connecting rods may swivel relative to the side rails 3. A bracket 19 is provided for each connecting rod and a fastening element 20 secures the upper end of the connecting rod in the bracket.

Figure 1:
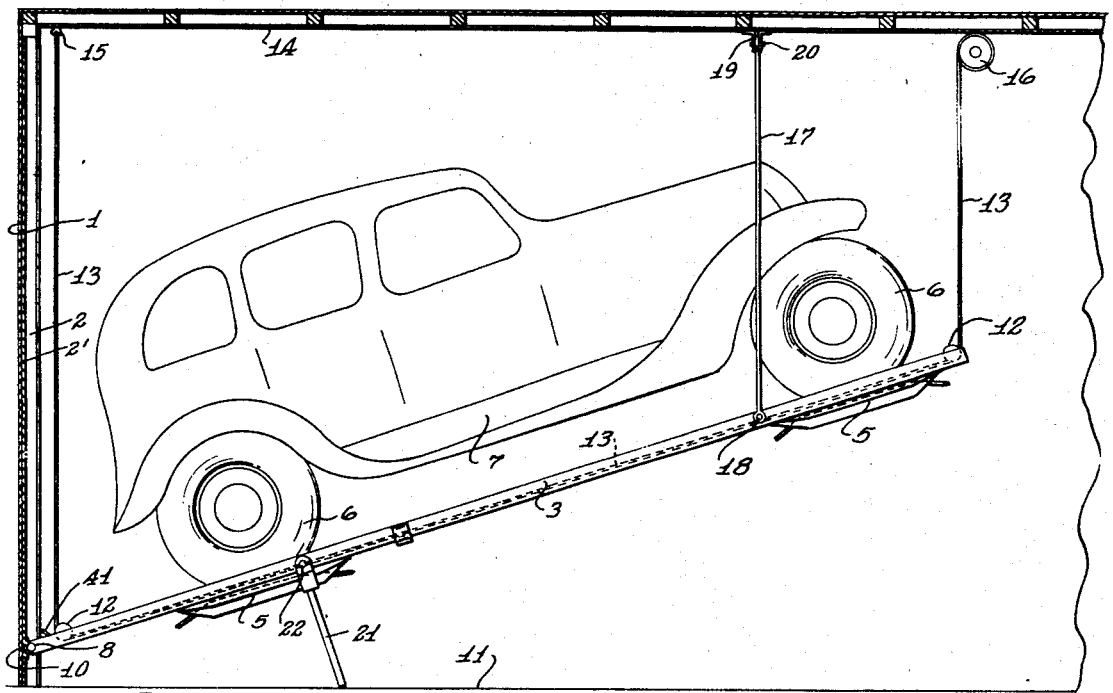
Fig. 1 is a side elevation of the decking device assembled in a freight car.

Mounted on each side rail 3 is a post 21, the latter having a pivotal connection as indicated at 22 so that it may be swung into a position where it engages the floor 11 as illustrated in Fig. 1. Spring clips 23 are secured to the side rails 3 and when the posts 21 are moved into engagement with the clips the latter retain them against pivotal movement.

On each cross tie 4 is provided a pair of brackets 24, spaced apart for rotatably supporting a shaft 25. Each shaft 25 supports a pair of spaced apart drums 26 and the part of the shaft exposed between the drums is squared or otherwise shaped as at 25' to receive a wrench. On each shaft is mounted a ratchet wheel 27 and a pawl 28 is pivotally mounted adjacent to the ratchet wheel so that it can be manually moved into or out of engagement therewith. Each drum 26 has the end of a cable 29 secured thereto, the free end of the cable being connected to a heavy coiled spring 30. Connected to the spring 30 is a chain 31 having a hook 33 on the end thereof so that the chain may be looped around and secured relative to an axle 32 of the automobile.

The initial operation in connection with decking the automobile is to lower the device so that the same rests upon the floor 11, or close enough to the floor that the automobile 7 may be driven onto the same so that its wheels 6 rest upon the tread plates 5. The chains 31 are then looped around the axles and hooked, and a wrench is applied to the squared part 25' so that the shaft 25 may be manually rotated to wind the cables 29 onto the drums 26. The ratchet 27 and pawl 28 function to prevent backward rotation of the shaft 25 and when the cables 29 are drawn taut by sufficient manual rotation of the shaft and drums, the automobile becomes secured to the device. The springs 30 render the tying device flexible and tend to cushion the shocks incurred in transit.

When the automobile has been secured to the decking device the hand levers 41 are manually moved so that the latch bolts 35 are caused to be projected by the springs 37. The drum 16 is then caused to be rotated and as the cables 13 are caused to wind around the drum 16 as a result of such rotation, the decking device is bodily lifted. As the decking device is lifted the latch bolts brush against the walls 2' of the guides 2 and snap into the notches 10. Another obvious procedure is to elevate the decking device until the ends of the rails 3 are in line with the notches 10 and then release the latch bolts 35. Still another procedure is to elevate the device and snap the bolts 35 into the notches 10 before the automobile has been secured on the decking device, this latter procedure being possible because of the fact that the notches 10 are located in close proximity to the floor and by using metal plates as ramps the automobile may be driven onto the tread plates 5.

When the latch bolts 35 enter the notches 10 they function to retain the guided ends of the rails 3 against further vertical movement and continued shortening of the cables 13 causes the other ends of the rails to be elevated and the decking device to be moved to the inclined position illustrated in Fig. 1.

When the decking device is not in use, that is to say, when the automobile has been removed therefrom, the drum 16 is rotated to wind the cable 13 to such an extent that the side rails 3 are moved into close proximity to the ceiling 14. To permit this function the hand levers 41 are moved to retract the latch bolts 35 so that they pass the notches 10 and leave the guided ends free to move vertically.

Although a specific embodiment of the present invention has been illustrated and described it is to be understood that various changes may be made within the scope of the appended claims without departing from the spirit of the invention.

Reference is made to the copending application for patent of William J. Nightingale, Serial No. 758,378, filed December 20, 1934, and to the copending application of Lawson H. Cooper and William J. Nightingale, Serial No. 194,892, filed March 9, 1938, which particularly describe and claim the construction of the cross frame members 4 and the wheel supporting portions 5 of the automobile decking device.

Reference is made to the copending application for patent of William J. Nightingale, Serial No. 758,377, filed December 20, 1934, which includes a description of and claims relating to elevating means for bodily raising the decking device or for swinging the same about its pivotal connection to a support.

Reference is also made to the copending application for patent of William J. Nightingale, Serial No. 66,373, filed February 29, 1936, which includes a description of and claims on a particular form of a vertical guide and pivotal support for one end of the decking device.

What I claim is:—

1. In combination with a freight car, a decking device adapted to support an automobile, guides mounted in a wall of said car and adapted to receive one end of said decking device, means for moving said decking device vertically, and releasable catch elements associated with said guide and automatically functioning after a predetermined vertical movement of said decking device to hold one end of said decking device stationary, said catch elements when holding said end of the decking device forming a pivotal connection about which the device may be swung to assume an angular position.

2. In combination with a freight car, a decking device adapted to receive an automobile, a set of sheaves on one side of said device adjacent the opposite ends thereof, a second set of sheaves on the other side of said device adjacent the opposite ends thereof, a cable trained under each set of sheaves, means for securing one end of each cable to the ceiling of said car, and a common winding means receiving the opposite ends of both cables whereby rotation of said means shortens said cables and causes said device to be lifted.

3. In combination with a freight car, a decking device adapted to support an automobile, guides mounted in a wall in said car and adapted to receive one end of said decking device, means for elevating said device, and releasable automatic means on said decking device for automatically engaging said guides at a predetermined stage in the movement of said device to retain the guided end of said device against further vertical movement.

4. In combination with a freight car, a decking device adapted to support an automobile, guides mounted in a wall in said car and adapted to receive one end of said decking device, means for elevating said device, and means on said decking device for engaging said guides to retain the guided end of said device against further vertical movement, said means comprising bolt members, and resilient means for projecting said bolt members into engagement with abutments on said guides.

5. In combination with a freight car, a decking device adapted to support an automobile, guides mounted in a wall in said car and adapted to receive one end of said decking device, means for elevating said device, means on said decking device for engaging said guides to retain the guided end of said device against further vertical movement, said means comprising bolt members, resilient means for projecting said bolt members into engagement with abutments on said guides, and manually operable means for controlling movement of said bolt members.

6. In combination with a freight car, a decking device adapted to support an automobile, guides mounted in a wall in said car and adapted to receive one end of said decking device, means for elevating said device, means on said decking device for engaging said guides to retain the guided end of said device against further vertical movement, said means comprising bolt members, resilient means for projecting said bolt members into engagement with abutments on said guides, and manually operable means for holding said bolts in a retracted position.

7. In an automobile decking device, a supporting and enclosing structure, means for receiving and supporting an automobile, cables trained under said automobile supporting means from one end thereof to the other, means for securing one end of each cable to the top of said enclosing structure above one end of said automobile supporting means, a common winding element for receiving the other ends of said cables, and means for securing said winding element to the top of said enclosing structure above the other end of said automobile supporting means.

8. In an automobile decking device, a supporting and enclosing structure, means for receiving and supporting an automobile, cables trained under said automobile supporting means from one end thereof to the other, means for securing one end of each cable to the top of said enclosing structure above one end of said automobile supporting means, a common winding element for receiving the other ends of said cables, means for securing said winding element to the top of said enclosing structure above the other end of said automobile supporting means, and an automatic stop means adapted to engage and hold one end of said automobile supporting means against movement in one direction.

9. In an automobile decking device, a supporting and enclosing structure, means for receiving and supporting an automobile, cables trained under said automobile supporting means, means for securing one end of each cable to the top of said enclosing structure adjacent to one end of said automobile supporting means, a common winding element for receiving the other ends of said cables, means for securing said winding element to the top of said enclosing structure adjacent to the other end of said automobile supporting means, an automatic stop means for holding one end of said automobile supporting means against movement in one direction, and means for releasing said stop means to permit movement of said automobile supporting means in both directions.

10. In combination with a supporting structure, a deck for receiving and supporting an automobile, said deck normally resting on the floor of said supporting structure, means for applying a force against said deck to impel it vertically, interlock elements carried by said structure and deck respectively, and means for guiding said interlock elements into interlocking relationship after a predetermined movement of said deck away from said floor whereby said interlocking elements hold one end of the deck against further movement.

11. In combination with a supporting structure, a deck for receiving and supporting an automobile, said deck normally resting on the floor of said supporting structure, means for applying a force against said deck to impel it vertically, interlock elements carried by said structure and deck respectively, and means for guiding said interlock elements into interlocking relationship after a predetermined movement of said deck away from said floor whereby said interlocking elements hold one end of the deck against further movement, and manual means for releasing said interlocking elements.

12. In combination with a freight car, a decking device adapted to support an automobile, vertical guides mounted in the freight car, means on said decking device slidably engageable in said vertical guides, and means for elevating said device in the freight car comprising a pair of cables each having one end attached to the ceiling of said freight car, said cables being trained longitudinally under said device from one end to the other end thereof, and a common winding element adjacent the ceiling of the freight car receiving the free unsecured ends of said cables and adapted to shorten the same simultaneously to raise the device.

13. In combination with a freight car, a decking device adapted to receive an automobile, means for moving said decking device vertically, means for guiding said decking device in vertical movement, automatic means associated with said guiding means for automatically stopping movement of one end of said decking device after a predetermined vertical movement thereof, said automatic means forming a pivot for said device so that upon further vertical movement of the free end of the device the device is caused to assume an angular position, and means carried by said decking device and adapted to engage the floor of said freight car to assist in supporting said decking device when it has been moved to an angular position.

14. In combination with a supporting structure having a floor, ceiling and spaced side walls, an automobile decking frame positioned longitudinally between said side walls, a pair of flexible cables for elevating said decking frame, said cables each being trained under said decking frame along opposite sides thereof from one end to the other end thereof, means for securing one end of each of said cables to said ceiling, and a common winding element adjacent said ceiling about which the unsecured ends of the cables are wound for joint operation thereby.

15. In combination with a supporting structure, a deck for receiving and supporting an automobile, means for elevating said deck adjacent said supporting structure, and means for pivotally coupling said deck to said supporting structure after the former has been raised to a predetermined height including cooperating interlocking elements carried on said deck and structure respectively and adapted after the deck has been raised to a predetermined height to interlock and restrain the adjacent part of the deck from further vertical movement, said cooperating elements adapted after interlocking engagement to form a pivotal connection about which the deck may be swung.

16. In combination with a supporting structure including a floor and a wall rising vertically therefrom, a deck for receiving and supporting an automobile, means for elevating the entire deck above said floor, means on said wall for slidably guiding said deck in a vertical path, and means for automatically pivotally coupling said deck to said structure comprising cooperative elements on said deck and in said guiding means operable after said deck has been raised to a predetermined height to engage with one another and restrain the deck from further vertical movement, said cooperating elements forming a pivotal connection about which said deck may be swung upon further upward movement.

17. In combination with a supporting structure having a floor, ceiling, and spaced wall supports extending between the floor and ceiling, an automobile decking frame, a pair of flexible cables extending longitudinally of said frame and connected to the opposite ends thereof and to the ceiling thereabove in such a way that upon shortening of the cables the entire frame may be raised above the floor or one end of the frame raised above the other end if the latter end is restrained from upward movement, and means for automatically pivotally connecting one end of said frame to said wall support comprising cooperative elements on said deck adjacent one end thereof and on one of said wall supports adapted when said deck has been raised to an intermediate height above the floor to interlock and restrain the end of the deck from further upward movement, said cooperating elements forming when interlocked a pivotal connection about which said deck may be upwardly swung by further shortening movement of said cables.

18. In combination with a supporting structure including a floor, a ceiling, spaced side and end walls, a deck for receiving and supporting an automobile positioned longitudinally between said side walls adjacent one end wall of said structure, means for elevating the entire deck above said floor, a pair of channel guides secured to said end wall in spaced parallel relationship, a pair of elements on one end of said deck each slidably engageable in one of said channel guides, means on each of said elements yieldably extensible beyond the end of its respective element, and means in said channel guides intermediate said floor and ceiling adapted to interlock with said extensible means and form pivotal connections about which the deck may be swung as it is raised in said structure.

19. In combination with a freight car, a decking device adapted to receive an automobile, means for moving said decking device vertically, means in a wall of the freight car for guiding one end of said decking device in vertical movement, means associated with said guide means for holding said end of the decking device against vertical movement but forming a pivotal support about which the deck may swing, and positive means for supporting said device when it has been moved to a predetermined position in said guide means, said last named means including posts pivotally mounted upon said decking devices, said posts being adapted to be moved pivotally into engagement with the floor of the freight car and acting in combination with said wall connection to support the decking device in raised position in the freight car, and retainer elements adapted to releasably hold said posts in parallel relationship with the decking device out of engagement with the floor.

20. In combination with a freight car having a floor, ceiling, and side and end walls, an automobile decking device extending longitudinally between the side walls adjacent one end wall of the freight car, said decking device having a pair of side members spaced apart wider than the transverse wheel base of an automobile, wheel plate supporting means between said side members at one end of the device for supporting one set of road wheels of an automobile, wheel plate supporting means between the other ends of the side members for supporting the other set of road wheels of an automobile, means extending transversely of the decking device between each set of wheel plate supporting means connecting the side members together into a rectangular frame, said last means extending transversely of the device a substantial distance outwardly from the inner ends of said wheel supporting plates, the decking device having a large central opening extending laterally to the side members between the wheel plate supporting means and longitudinally toward the opposite ends of the device to said transverse extending means, a pair of vertical guide means in the end wall of the freight car with which the decking device is associated, means on the ends of said side members slidably coupled one in each of said guide means, means for releasably pivotally connecting the slidably coupled ends the decking device to said guide means at a point spaced above the floor of the freight car, means for elevating said decking device and for pivoting the same about its connection to the end wall of the freight car to various raised and angular positions therein, and means depending from the ceiling of the freight car for connection to the free end section of the decking device to support the free end thereof above the level of the pivotally connected end of the device, the decking device when thus positioned adapted to carry an automobile in inclined position and to allow a second automobile on the floor to pass thereunder and project through the large central opening in the device.

21. In combination with a freight car having a floor, ceiling and side and end walls, an automobile decking device extending longitudinally between the side walls adjacent one end wall of the freight car, said decking device having a pair of side members spaced apart wider than the transverse wheel base of an automobile, wheel plate supporting means between said side members at one end of the device for supporting one set of road wheels of an automobile, wheel plate supporting means between the other ends of the side members for supporting the other set of road wheels of an automobile, means extending transversely of the decking device between each set of wheel plate supporting means connecting the side members together into a rectangular frame, said last means extending transversely of the device a substantial distance outwardly from the inner ends of said wheel supporting plates, the decking device having a large central opening extending laterally to the side members between the wheel plate supporting means and longitudinally toward the opposite ends of the device to said transverse extending means, a pair of vertical guide means in the end wall of the freight car with which the decking device is associated, means on the ends of said side members slidably coupled one in each of said guide means, means for releasably pivotally connecting the slidably coupled ends of the decking device to said guide means at a point spaced above the floor of the freight car, means for elevating said decking device and for pivoting the same about its connection to the end wall of the freight car to various raised and angular positions therein, the decking device when raised and inclined to a position wherein the free end is a substantial distance above the pivotally connected end affording a large central space in the decking device into which an automobile on the freight car floor may project in order to advance it as far toward the end wall as possible under the decking device.

22. In combination with a supporting structure having a floor and upright supporting means on the floor, a decking device adapted to receive and support an automobile thereon, vertical guide means in said upright supporting means, means slidably coupling one end of said device in said guide means, means in said guide means at a point spaced above the floor but below the upper end of said guide means forming a pivotal support for the device to swing thereabout, additional means for releasably pivotally securing said coupled end of the decking frame to said pivotal support, and elevating means for raising the entire decking device to various heights above the floor when the coupled end thereof is released from pivotal securement or for swinging the free end of the decking device about the slidably coupled end thereof when the latter is pivotally secured to said guide means.

23. In a transporting vehicle having a floor, a ceiling, side walls and an end wall, an automobile decking frame positioned longitudinally between said side walls and adjacent to said end wall, means in said end wall of the transporting vehicle for guiding one end of said decking frame in vertical movement, means for releasably pivotally connecting the guided end of said decking frame to said guide means at a point closer to the floor than to the ceiling and forming a pivotal support therefor, elevating means in said vehicle for raising the entire decking frame from a position adjacent to the floor to a position adjacent to the ceiling when released from said pivotal support or for swinging the free end of the decking frame above the other guided end thereof when the latter is pivotally connected to said pivotal support, and means for suspending the free end of the decking frame from a fixed support in the transporting vehicle at a height above the level of said pivotal support on the end wall whereby when the decking frame is thus pivotally connected to the end wall at one end and suspended from the fixed support at the other end it assumes a downwardly inclined position toward the end wall of the transporting vehicle, said pivotal support and said suspending means adapted to carry the load of the decking frame and an automobile loaded thereon.

LAWSON H. COOPER.